US011444825B2

United States Patent
Ye et al.

(10) Patent No.: US 11,444,825 B2
(45) Date of Patent: Sep. 13, 2022

(54) MICROWAVE NODE FOR AN ERP NETWORK

(71) Applicant: Huawei Technologies Co., Ltd., Shenzhen (CN)

(72) Inventors: Min Ye, Chengdu (CN); Italo Busi, Segrate (IT)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/919,950

(22) Filed: Jul. 2, 2020

(65) Prior Publication Data
US 2020/0336363 A1    Oct. 22, 2020

Related U.S. Application Data

(63) Continuation of application No. PCT/EP2018/050268, filed on Jan. 5, 2018.

(51) Int. Cl.
| G06F 15/173 | (2006.01) |
| H04L 41/0654 | (2022.01) |
| H04L 43/0882 | (2022.01) |
| G06F 15/16 | (2006.01) |

(52) U.S. Cl.
CPC ...... *H04L 41/0654* (2013.01); *H04L 43/0882* (2013.01)

(58) Field of Classification Search
CPC ............. H04L 41/0654; H04L 43/0882; H04L 41/0663; H04L 41/083; H04L 43/16; H04L 12/437
USPC ........................................................ 709/224
See application file for complete search history.

(56) References Cited

U.S. PATENT DOCUMENTS

| 9,780,964 | B1 | 10/2017 | Salam et al. |
| 2013/0286818 | A1 | 10/2013 | Long et al. |
| 2014/0254347 | A1 | 9/2014 | Xie et al. |
| 2014/0293774 | A1 | 10/2014 | Behrens et al. |
| 2014/0355447 | A1* | 12/2014 | Gohite .................. H04W 40/34 370/236 |
| 2017/0339028 | A1* | 11/2017 | Holness ............... G06F 11/3409 |
| 2018/0076976 | A1* | 3/2018 | Chhabra ................ H04L 12/437 |
| 2018/0270083 | A1* | 9/2018 | Murray ................... H04L 69/40 |

(Continued)

FOREIGN PATENT DOCUMENTS

| CN | 102726006 A | 10/2012 |
| CN | 102754390 A | 10/2012 |
| CN | 104040959 A | 9/2014 |

(Continued)

OTHER PUBLICATIONS

Huawei Technologies, "Applicability of G.8032 to networks using microwave links," International Telecommunication Union, Telecommunication Standardization Sector, SG15-C.266, Study Group 15, Geneva, Jun. 19-30, 2017 2 pages.

(Continued)

*Primary Examiner* — Karen C Tang
(74) *Attorney, Agent, or Firm* — Slater Matsil, LLP

(57) ABSTRACT

A node comprises at least one processor configured to determine whether a degree of bandwidth degradation of a local link of the microwave node fulfils a degradation condition. Further, the at least one processor is configured to generate a signal indicating a fail of the local link, if the degradation condition is fulfilled.

20 Claims, 12 Drawing Sheets

(56) References Cited

U.S. PATENT DOCUMENTS

2019/0020500 A1* 1/2019 She .................. H04L 41/12

FOREIGN PATENT DOCUMENTS

| CN | 105591859 A | 5/2016 |
| CN | 103190121 B | 10/2016 |
| CN | 107276899 A | 10/2017 |
| EP | 2775669 A1 | 9/2014 |

OTHER PUBLICATIONS

ITU-T Recommendation G.8013/Y.1731, "OAM functions and mechanisms for Ethernet-based networks," Aug. 2015, 102 pages.
ITU-T Recommendation G.8021/Y.1341, Part 1 of 2 "Characteristics of Ethernet transport network equipment functional blocks," Nov. 2016, 99 pages.
ITU-T Recommendation G.8021/Y.1341, Part 2 of 2 "Characteristics of Ethernet transport network equipment functional blocks," Nov. 2016, 207 pages.
ITU-T Recommendation G.8032/Y.1344, "Ethernet ring protection switching," Aug. 2015, 82 pages.

* cited by examiner

MICROWAVE NODE FOR AN ERP NETWORK

CROSS-REFERENCE TO RELATED APPLICATIONS

This application is a continuation of International Patent Application No. PCT/EP2018/050268, filed on Jan. 5, 2018. The disclosure of the aforementioned application is hereby incorporated by reference in its entirety.

TECHNICAL FIELD

The present invention relates to a microwave node for an Ethernet Ring Protection (ERP) network. Furthermore, the present invention relates to a corresponding method for triggering ERP protection switching. In particular, the microwave node and method of the invention address the issue of bandwidth degradation of local microwave links in an ERP network.

BACKGROUND

ITU-T ERP, which is defined in ITU-T G.8032, is widely used in Ethernet transport networks. ERP is also used with Ethernet rings built with microwave nodes (using microwave links).

In Ethernet Rings one link in the network is configured, for instance by the operator, as Ring Protection Link (RPL). Under normal conditions, the RPL is blocked from forwarding data to avoid forwarding loops within the ERP network. If any link in the conventional ERP network of FIG. 12(A) fails, e.g. if the link BC between the nodes B and C fails and thus drops to zero bandwidth, then the nodes B and C are able to block this link BC, and the nodes F and E can unblock the RPL, which is used to recover the traffic. Thus, in spite of the failed link BC, traffic forwarding on the ring is recovered and the bandwidth of the ring network can be maintained at 400 Mbps (since the RPL is also configured with 400 Mbps).

SUMMARY

Microwave links between microwave nodes are bandwidth-variable. That means, degradation conditions may occur that reduce the bandwidth of the microwave links. This case is problematic in the conventional ERP network. For example, if there is bandwidth degradation (not fail) on a link, then this becomes the bottleneck of the entire ERP network and the ring throughput is decreased to the degraded bandwidth of the link. The RPL is not unblocked in this case. As a consequence the ring link bandwidth cannot be utilized maximally.

In view of the above-mentioned problem, the present disclosure aims to improve conventional ERP (networks).

The present disclosure has the object to enable ERP to take into account bandwidth degradation of microwave links in an Ethernet ring. To this end, the present disclosure has the goal to provide a microwave node and a method, which enable protecting an ERP network against microwave link degradation. Accordingly, also a bandwidth utilization of such a ring network should be improved. Thereby, multiple failure scenarios may be supported, including at least signal fail and microwave link degradation conditions on different links in the same ERP network. The solution of the disclosure may also be backward compatible with existing non-microwave nodes on the same ERP network. Finally, the solution of the disclosure may not require any modification of the protocol and state machines of G.8032.

The object of the present disclosure is achieved by the solution provided in the enclosed independent claims. Advantageous implementations of the present disclosure are further defined in the dependent claims.

In particular, the present disclosure proposes generating the signal that indicates a fail of a local microwave link also when its bandwidth degrades (but not fails). ERP protection switching may then be triggered by inputting this signal to the ERP state machine as currently defined in G.8032. Thus, no changes to the existing ERP protocol and state machine is necessary.

A first aspect of the present disclosure provides a microwave node for an ERP network, comprising at least one processor configured to determine whether a degree of bandwidth degradation of a local link of the microwave node fulfils a degradation condition, and generate a signal indicating a fail of the local link, if the degradation condition is fulfilled.

The local link is a microwave link. The at least one processor may include at least two decision logics (or decision processes or decision units). The first decision logic may be implemented to determine the degree of bandwidth degradation of the local link of the node, and to further determine whether the degraded bandwidth fulfills the degradation condition. The second decision logic may be implemented to decide whether to generate the signal indicating a fail of the local link or not. The signal indicating a fail of the local link may be generated when the first decision logic determines that that the degradation condition is fulfilled. The first decision logic may indicate this to the second decision logic by generating a bandwidth degradation signal when the degradation condition is fulfilled. The signal indicating a fail of the local link generated by the second decision logic may be input into an ERP state machine (realized for instance by an ERP control process as defined in G.8032 and G.8021). The state machine can then further decide whether and how to trigger ERP switching.

The microwave node of the first aspect thus enables protect an ERP network, in which it is included, against microwave link degradation. Accordingly, the bandwidth utilization of ERP network can be improved. With multiple such microwave nodes in the ERP network, multiple failure scenarios are supported, e.g. signal fail and microwave link degradation conditions on different links.

In an implementation form of the first aspect, the at least one processor is configured to determine that the local link is under bandwidth degradation, if the current bandwidth of the local link is smaller than its nominal bandwidth but larger than zero bandwidth.

That is, bandwidth degradation of a microwave link is different from a fail of said link.

In a further implementation of the first aspect, the signal indicating a fail of the local link is a signal fail (SF) or a manual switch (MS) signal.

In a further implementation of the first aspect, for determining whether the degree of bandwidth degradation of the local link fulfills the degradation condition, the at least one processor is configured to determine whether the local link is currently the link in the ERP network with the lowest bandwidth.

That means, protection is advantageously triggered on the link with the lowest bandwidth, in order to maximize the bandwidth utilization of the ERP network as much as possible.

In a further implementation of the first aspect, the microwave node is further configured to receive a bandwidth notification message (BNM), e.g., one or more BNM messages, from another microwave node in the ERP network, the BNM including current bandwidth information of a remote link of the other microwave node, wherein for determining whether the local link is currently the link in the ERP network with the lowest bandwidth, the at least one processor is configured to compare the current bandwidth of the local link with the current bandwidth information of the remote link included in the received BNM.

For instance, all microwave nodes of the first aspect on the Ethernet ring may send, via the BNM, current bandwidth information of their respective link(s) to all the other microwave nodes on the same ring. Each microwave node may then use the received BNM and included information, in order to compare the current bandwidth of its local link with the current bandwidth of the remote links. ERP protection switching may be triggered, if the local link is determined to be the one with the lowest current bandwidth.

The current bandwidth of the local link may be obtained by the microwave node of the first aspect by its local microwave interface. The current bandwidths of the remote links are obtained via received BNMs as described above.

In a further implementation of the first aspect, for determining whether the local link is currently the link in the ERP network having the lowest bandwidth, the at least one processor is configured to apply a tiebreak condition, if the current bandwidth of the local link matches the current bandwidth information of the remote link included in the BNM message. In a possible implementation, matching of the current bandwidth of the local link with the current bandwidth information of the remote link is done by checking whether the current bandwidth of the local link is equal to the current bandwidth information of the remote link included in the received BNM message.

The tiebreak mechanism ensures that ERP protection switching is triggered only on one microwave link, in case that there are more microwave links having in common the lowest current bandwidth.

In a further implementation of the first aspect, for applying the tiebreak condition, the at least one processor is configured to determine the link of the node having the lowest MAC address as the link currently having the lowest bandwidth in the ERP network.

This provides an easy to implement but efficient tiebreak mechanism.

In a further implementation of the first aspect, the microwave node is configured to send a BNM including current bandwidth information of the local link to all other nodes in the ERP network. The microwave node may send one or more BNM messages.

Accordingly, other microwave nodes according to the first aspect in the same ERP network are able to obtain the current bandwidth, and compare their local link bandwidth with the bandwidth information reported via BNM. If the local link of the microwave node fails, it is configured to generate a BNM (one or more messages) with a zero current bandwidth as the current bandwidth information. Therefore, any other degraded microwave link in the ERP network will not be considered the link with the lowest current bandwidth. This avoids blocking a degraded link while there is also a failed link on the same ring.

In a further implementation of the first aspect, the microwave node is further configured to send a message notifying a fail of the local link to the other nodes in the ERP network, and the message and the BNM, which are sent to the other nodes, include the same identifier of the microwave node and local link.

The message may be a Ring Automatic Protection Switching message indicating signal fail (RAPS (SF)). The common identifier allows the other nodes to determine that the microwave node sent the message and the BNM for the same link. This helps distinguishing from fail messages, e.g. RAPS (SF) messages, from non-microwave nodes (which do not generate BNM) or from microwave nodes configured not to generate a BNM (one or more messages) with zero current bandwidth during fail conditions.

In a further implementation of the first aspect, the microwave node further comprises an ERP control process configured to receive the signal indicating a fail of the local link generated by the at least one processor, and able to block the local link upon receiving said signal.

In an implementation the ERP control process may be implemented as an ERP controller.

That is, the ERP control process may trigger ERP switching also in case that there is a bandwidth degradation of the local link, not a failed link. Thus, the bandwidth utilization of the ring is improved.

In a further implementation of the first aspect, if the microwave node is an owner node or neighboring node of a RPL of the EPR network, the ERP control process is able to unblock the RPL upon receiving the signal indicating a fail of the local link from the at least one processor.

Opening the RPL, while the degraded link in the ERP network is blocked, increases the bandwidth throughput of the ring.

In a further implementation of the first aspect, the at least one processor is configured to determine that the degradation condition is not fulfilled, if the microwave node receives a Ring Automatic Protection Switching message indicating signal fail (RAPS (SF)), but no BNM from another node in the EPR network.

This may be the case, if a non-microwave node in the same ERP network sends a RAPS (SF) message notifying a failed link and it would not send any BNM. If a non-microwave link within the ring fails, degraded microwave links should not trigger any protection switching. Further, also microwave nodes in the same ERP network may be configured not to generate BNM with zero current bandwidth. Therefore, at least the microwave nodes attached to the microwave link with the lowest current bandwidth should check the information from received BNM and RAPS messages, in order to understand whether there is a failed microwave or non-microwave link within the ring. A RAPS (SF) messages but no BNM will be sent for this link. Accordingly, this implementation form avoids blocking degraded links, while other failed links are blocked.

As a consequence, the solution of the disclosure is backward compatible with existing non-microwave nodes, not supporting the present disclosure on the same ERP ring. For instance, this may occur in hybrid networks where microwave and non-microwave nodes co-exist on the same ERP-protected ring. The solution of the disclosure, when deployed in such hybrid ERP rings, enhances the ERP protection switching to be backward compatible with non-microwave ERP nodes assuming that these nodes implement ERP as described in G.8032 and G.8021 and therefore they do not generate BNM and ignore any received BNM.

In a further implementation of the first aspect, the ERP control process is able to unblock the local link, if the at least one processor determines that the degree of bandwidth degradation of the local link does not anymore fulfill the degradation condition.

For instance, if the bandwidth degradation is overcome and the local link returns to its nominal bandwidth, blocking this local link is no longer necessary.

In a further implementation of the first aspect, the ERP control process is able to unblock the local link, if the at least one processor determines based on the received BNM that the local link is currently not anymore the link in the ERP network with the lowest bandwidth.

This avoids that a link is blocked that is not the bottleneck of the ring, thereby increasing the throughput of the ring and improving bandwidth utilization.

In a further implementation of the first aspect, for determining whether the degree of bandwidth degradation of the local link fulfills the degradation condition, the at least one processor is configured to determine whether the bandwidth of the local link of the microwave node is below a configured nominal bandwidth of a RPL of the ERP network.

This is particularly advantageous, if the RPL is a non-microwave link or if the RPL is a microwave link but no BNMs indicating current bandwidth are sent during normal conditions. In this case, the RPL nominal bandwidth may be configured on all the microwave nodes on the ring, in order to ensure that ERP protection switching is triggered only when the local link bandwidth degrades below the bandwidth of the RPL link, at which point a degradation of the bandwidth of the whole ring starts.

In a further implementation of the first aspect, the at least one processor is configured to generate the signal indicating a fail of the local link, if it determines that the degradation condition is fulfilled and/or that at least one local fail condition is fulfilled.

Thus the decision of the at least one processor (e.g. by the second decision logic) concerning a failure condition may base on different criteria (e.g. OAM protocols) as defined in G.8021. The processor may generate the signal by applying a logical "or" between the degradation condition and the criteria defined in G.8021.

A second aspect of the present disclosure provides a method for ERP, comprising determining whether a degree of a bandwidth degradation of a local link of a microwave node fulfils a degradation condition, and generating a signal indicating a fail of the local link, if the degradation condition is fulfilled.

In an implementation form of the second aspect, the method comprises determining that the local link is under bandwidth degradation, if the current bandwidth of the local link is smaller than its nominal bandwidth but larger than zero bandwidth.

In a further implementation of the second aspect, the signal indicating a fail of the local link is a signal fail (SF) or a manual switch (MS) signal.

In a further implementation of the second aspect, for determining whether the degree of bandwidth degradation of the local link fulfills the degradation condition, the method comprises determining whether the local link is currently the link in the ERP network with the lowest bandwidth.

In a further implementation of the second aspect, the method further comprises receiving a bandwidth notification message (BNM) from a microwave node in the ERP network, the BNM including current bandwidth information of a remote link of the microwave node, wherein for determining whether the local link is currently the link in the ERP network with the lowest bandwidth, the method comprises comparing the current bandwidth of the local link with the current bandwidth information of the remote link included in the BNM.

In a further implementation of the second aspect, for determining whether the local link is currently the link in the ERP network having the lowest bandwidth, the method comprises applying a tiebreak condition, if the current bandwidth of the local link matches (e.g. it is equal to) the current bandwidth information of the remote link included in the BNM message.

In a further implementation of the second aspect, for applying the tiebreak condition, the method comprises determining the link of the node having the lowest MAC address as the link currently having the lowest bandwidth in the ERP network.

In a further implementation of the second aspect, method further comprises sending a BNM (one or more messages) including current bandwidth information of the local link to all nodes in the ERP network.

In a further implementation of the second aspect, the method comprises sending a message notifying a fail of the local link to the nodes in the ERP network, and the message and the BNM, which are sent to the nodes, include the same identifier of a microwave node and a local link.

In a further implementation of the second aspect, the method further comprises receiving the signal indicating a fail of the local link, and blocking the local link upon receiving said signal.

In a further implementation of the second aspect, the method comprises unblocking an RPL upon receiving the signal indicating a fail of the local link.

In a further implementation of the second aspect, the method further comprises determining that the degradation condition is not fulfilled, if receiving a Ring Automatic Protection Switching message indicating signal fail (RAPS (SF)), but no BNM from a node in the EPR network.

In a further implementation of the second aspect, the method comprises unblocking the local link, if determining that the degree of bandwidth degradation of the local link does not anymore fulfill the degradation condition.

In a further implementation of the second aspect, method comprises unblocking the local link, if determining based on the received BNM that the local link is currently not anymore the link in the ERP network with the lowest bandwidth.

In a further implementation of the second aspect, for determining whether the degree of bandwidth degradation of the local link fulfills the degradation condition, the method comprises determining whether the bandwidth of the local link of the microwave node is below a configured nominal bandwidth of a RPL of the ERP network.

In a further implementation of the second aspect, the method further comprises generating the signal indicating a fail of the local link, if determining that the degradation condition is fulfilled and/or that at least one local fail condition is fulfilled.

The method of the second aspect and its implementation forms achieves all the advantages and effects described above for the microwave node of the first aspect and its respective implementation forms.

According to a third aspect, a computer program product is given storing instructions, which when executed on a processor perform the steps of the method according to the second aspect and any of the implementation forms of the second aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTION OF ILLUSTRATIVE EMBODIMENTS

Figure 1:
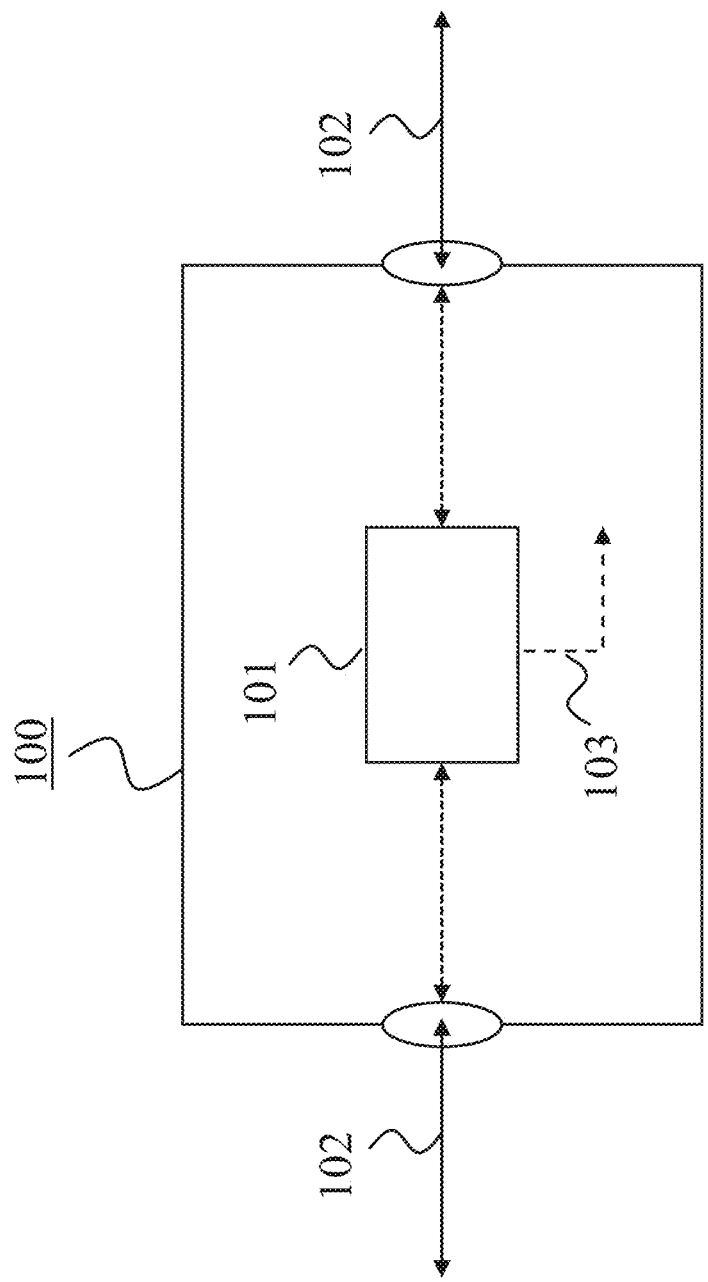
FIG. 1 shows a microwave node according to an embodiment of the present invention.

FIG. 1 shows a microwave node 100 according to an embodiment of the invention. The microwave node 100 of FIG. 1 is configured for being used in an ERP network 400 (see e.g. FIG. 4), and comprises at least one processor 101.

The at least one processor 101 may comprise one or more decision logics, or may be configured to carry out one or more decision processes.

In particular, the at least one processor 101 is configured to determine, whether a degree of bandwidth degradation of a local link 102 of the microwave node 100 fulfils a degradation condition. Notably, the microwave node 100 of FIG. 1 is shown to be connected to two microwave links 102. However, a microwave node 100 in this document is one that is connected to at least one microwave link 102. For instance, a first decision logic or first processor of the at least one processor 101 may decide whether the bandwidth is degraded and/or to what degree the bandwidth is degraded. The first decision logic or first processor may subsequently also decide whether the degree of the bandwidth degradation is such that it fulfills the degradation condition. In this case, it may generate a bandwidth degradation signal.

The at least one processor 101 is then further configured to generate a signal 103 indicating a fail of the local link 102, e.g. if the degradation condition is fulfilled. The signal 103 may, for instance, be issued by a second decision logic or second processor of the at least one processor 101 based on the bandwidth degradation signal.

Figure 2:
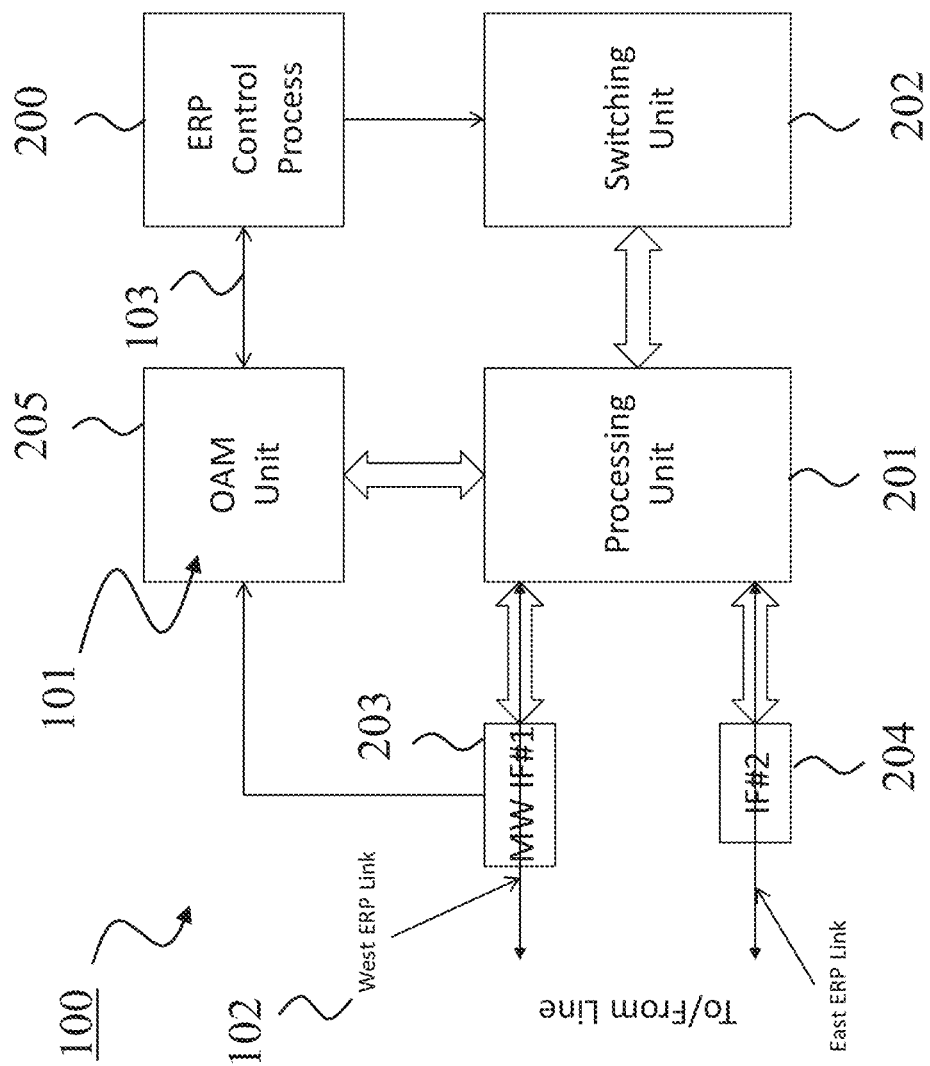
FIG. 2 shows a microwave node according to an embodiment of the present invention.

FIG. 2 shows a microwave node 100 according to an embodiment of the invention, which builds on the microwave node 100 shown in FIG. 1. In particular, FIG. 2 shows an exemplary implementation for the microwave node 100. FIG. 2 thereby shows a high-level block diagram of the microwave node 100. The at least one processor 101 of the microwave node 100 is, or is included in, an Operation, Administration and Maintenance (OAM) unit 205.

It is assumed that this microwave node 100 sends/receives traffic to/from at least two interfaces: one micro-wave interface 203, here supporting a microwave link 102 as West ERP link, and one non-microwave interface 204, here supporting a non-microwave link 701 (see FIG. 7) as East ERP link. The microwave interface 203 is capable of reporting to the OAM unit 205 the nominal bandwidth and the current bandwidth of the microwave link 102 of the node 100. This information may be used to generate BNMs and send them along the ring.

The traffic for the two interfaces 203 and 204 may be processed by a common processing unit 201. The processing unit 201 may process the traffic (e.g. Ethernet frames) received from the line (e.g. one of the West ERP link and East ERP link), as specified in relevant standards, to understand to which connection the traffic belongs to, and to decide how it has to be further processed.

The traffic to be forwarded may be passed to a switching unit 202, together with the information needed to properly forward it toward the egress. Some of the traffic received from the line can contain OAM information (e.g. Ethernet OAM frames) to be processed locally by the microwave node 100. This information may be sent to the OAM unit 205, together with the information identifying the associated maintenance entity.

The processing unit 201 may also be responsible for properly formatting the egress traffic, as received from the switching unit 202, for being transmitted toward the line. The processing unit 201 may also receive OAM information from the OAM unit 205 to be forwarded either toward the line (likewise the traffic received from the switching unit 202) or toward the switching unit 202 (likewise the traffic received from the line).

The microwave node 100 FIG. 2 further includes an ERP control process 200 (as defined in G.8021 and G.8032), which may implement an ERP state machine, e.g. as defined in G.8021 and G.8032. It receives the signal 103 indicating a fail of the microwave link 102, e.g. implemented as SF, and may optionally receive RAPS information from the OAM unit 205. The ERP control process may be implemented by a hardware controller, such as an EPR controller, or may be executed by a processor, which may be the processor 101 or another dedicated or shared processor.

Figure 3:
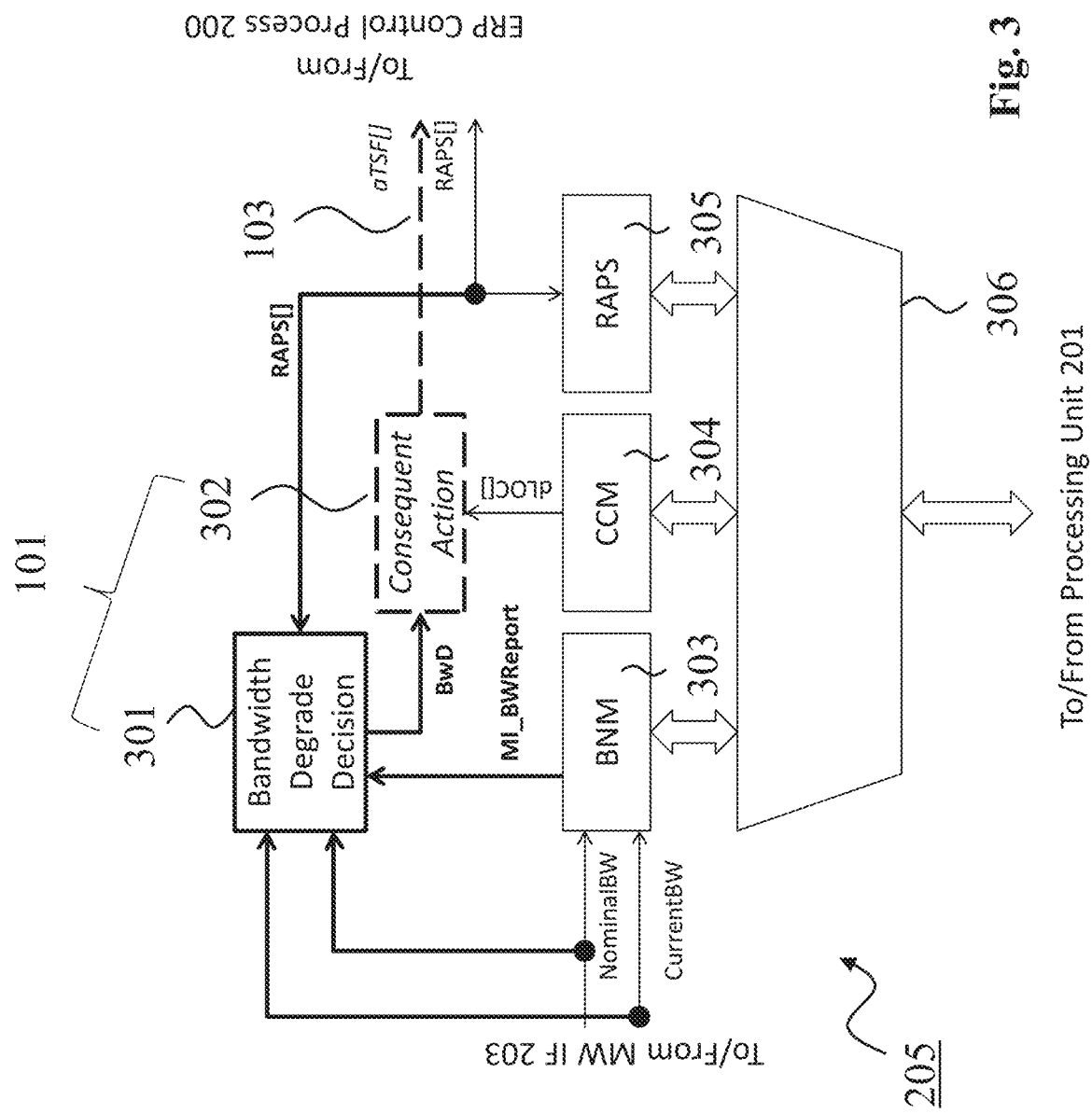
FIG. 3 shows a part of the OAM unit within a microwave node according to an embodiment of the present invention.

The OAM unit 205 of this exemplary microwave node 100 of FIG. 2 is shown in more detail in FIG. 3, and may be composed of different functional blocks implementing different OAM functions and by one multiplexer/demultiplexer 306, which may multiplex OAM information generated by the OAM functional blocks toward the processing unit 201, and demultiplex the OAM information received from the processing unit 201 toward the proper OAM functional block. In case of Ethernet, the demultiplexing of received OAM frames toward different OAM processing units may be based on the OpCode field in the Ethernet OAM PDU, as defined in ITU-T Recommendation G.8013.

A BNM block 303 processes received BNMs and reports current bandwidth information (e.g. current bandwidths) of remote microwave links 102 of other microwave nodes 100 using, for instance, the MI_BWReport information defined in ITU-T G.8021. It may also generate BNMs to be sent along the ring, in order to notify current bandwidth information (for instance the current bandwidth and the nominal bandwidth of the local microwave link 102) as received from the microwave interface 203.

A CCM block 304 generates CCM frames and processes received CCM frames on a given maintenance entity, implementing CCM state machines as defined in ITU-T Recommendation G.8021. It may support many instances of these state machines, e.g. one for each maintenance entity. It may also provide, for each maintenance entity, dLOC (and other CCM-related defect) information to the at least one processor 101, e.g. a Consequent Action block 302 (see below) as defined in ITU-T Recommendation G.8021.

A RAPS block 305 generates RAPS OAM messages to carry the RAPS information received from the ERP control process 200 and report back the RAPS information carried by the RAPS OAM messages, which it receives from the processing unit 201.

The at least one processor 101 includes in FIG. 3 a Bandwidth Degrade Decision block 301 (first decision logic mentioned above) and a Consequent Action block 302 (second decision logic mentioned above). The Bandwidth Degrade Decision block 301 is configured to determine whether a degree of bandwidth degradation of the local microwave link 102 of the microwave node 100 fulfils the degradation condition. If the degradation condition is fulfilled, it may output a bandwidth degradation signal (BwD) to the Consequent Action block 302. The Consequent Action block 302 can then decide based on this bandwidth degradation signal (and optionally based on further input from the CCM block 304) whether to generate the signal 103 indicating a fail of the local link. In particular, the Consequent Action block 302 may report via aTSF[ ] signal 103 a failure of the microwave link 102 (both in case of a real failure and also in case of a microwave bandwidth degradation that fulfils the degradation condition) to the ERP control process 200. To this end, the Bandwidth Degrade Decision block 301 may further receive from the RAPS block 305 the RAPS information carried by the RAPS OAM messages received from the processing unit 201.

Figure 4:
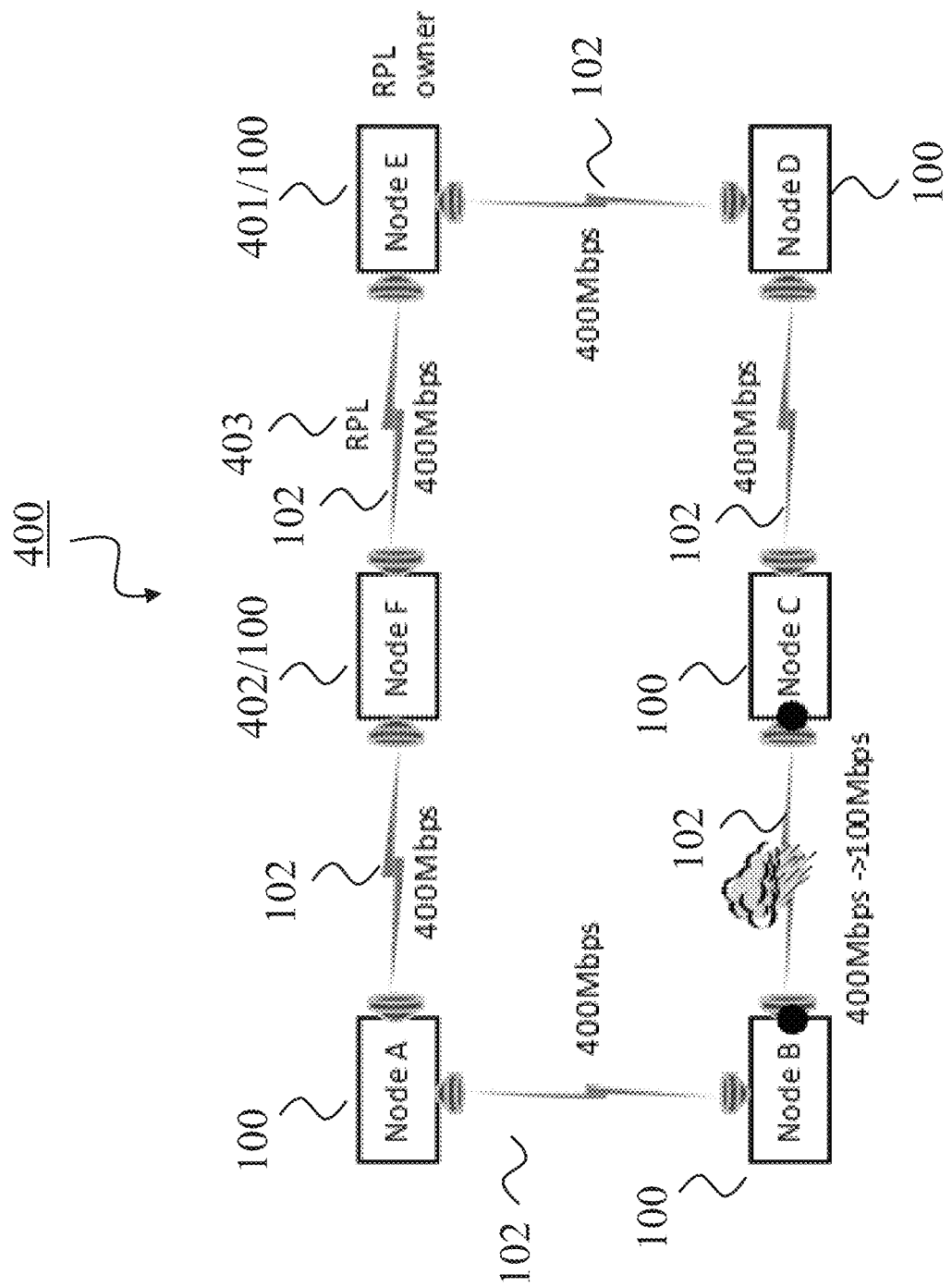
FIG. 4 shows an ERP network comprising microwave nodes according to an embodiment of the present invention, wherein one microwave link of the ERP network is degraded.
Figure 12:
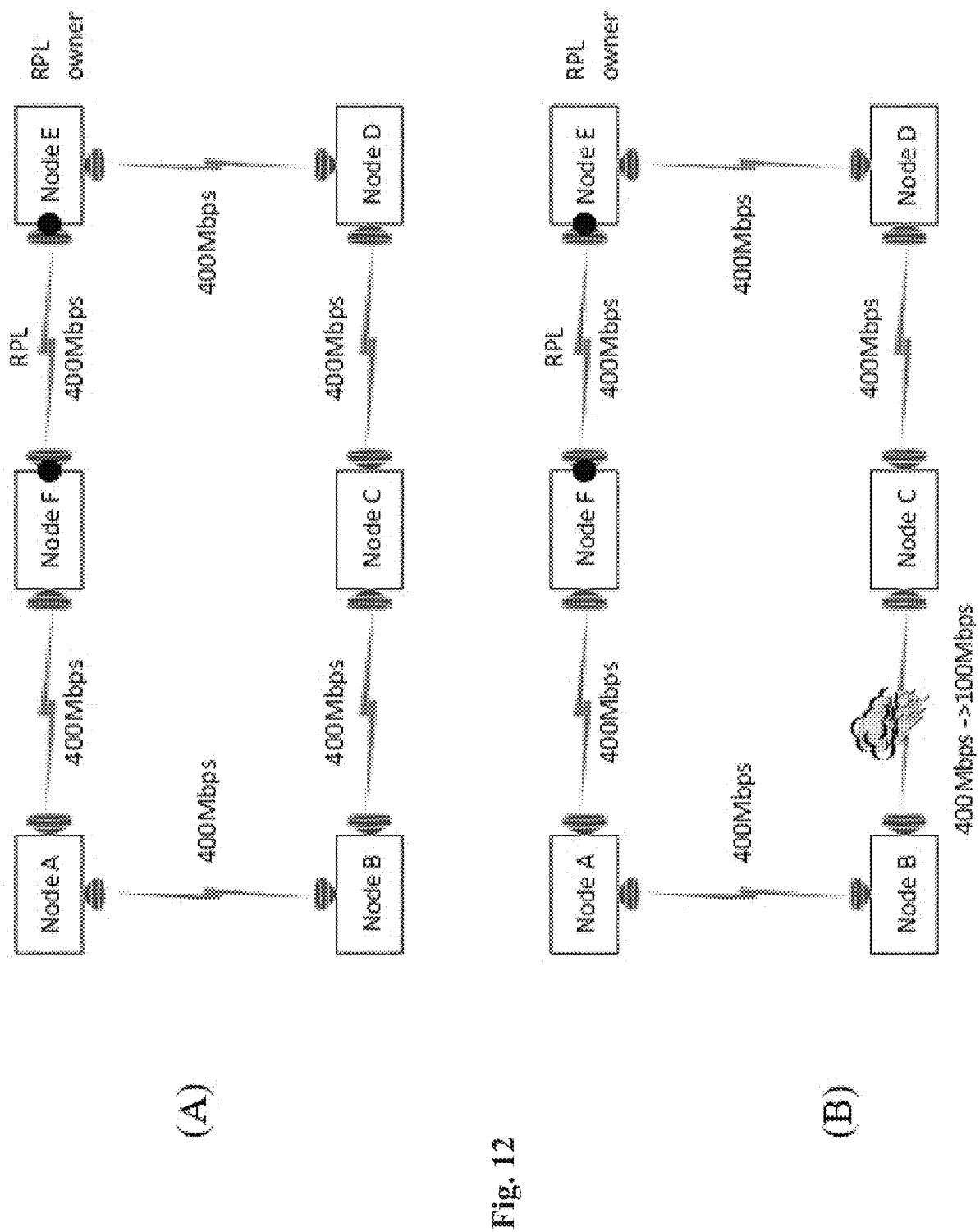
FIG. 12 shows an ERP network comprising conventional microwave nodes.

FIG. 4 shows a plurality of the microwave nodes 100 as described with respect to FIG. 1 and/or FIG. 2 and FIG. 3 in an ERP network 400 (which is similar to the conventional ERP network shown in FIG. 12).

FIG. 4 particularly illustrates the effect that can be achieved with using such microwave nodes 100 according to embodiments of the invention, instead of conventional microwave nodes as are used in FIG. 12. Namely, with these nodes 100 it is possible also in case of a bandwidth degradation to enable an ERP protection switching. For instance, if the link BC between node B and node C exhibits bandwidth degradation—here the bandwidth of the link 102 degrades from its nominal bandwidth of 400 Mbps to a degraded bandwidth of 100 Mbps—it can be blocked by the nodes B and C, and the RPL link 403 can be opened instead. The RPL link 403 is maintained by an RPL owner 401 (here Node E) and an RPL neighbor 402 (here Node F). These nodes are responsible for blocking/unblocking the RPL 403. This leads to an increase of the whole ring network throughput (to be kept at 400 Mbps). ERP protection switching means blocking a failed or degraded link 102 and switching instead to the RPL 403, in order to protect the ring bandwidth.

In the following, further advantages are illustrated, which are achievable when using microwave nodes 100 according to embodiments of the invention. To this end, different ERP networks 400 and different scenarios are shown.

Figure 5:
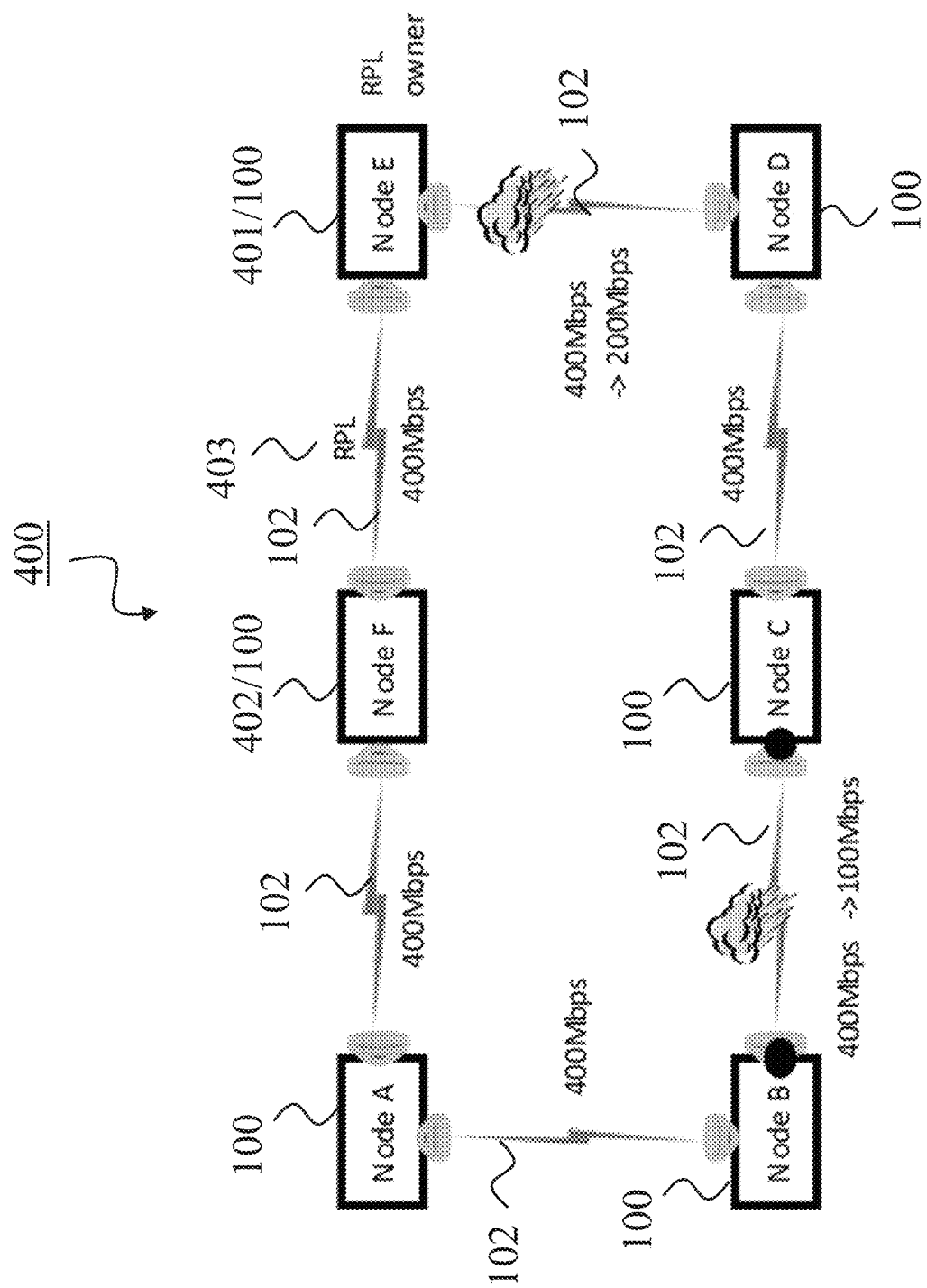
FIG. 5 shows an ERP network comprising microwave nodes according to an embodiment of the present invention, wherein two microwave links of the ERP network are unequally degraded.

FIG. 5 shows an ERP network 400 comprising microwave nodes 100 according to an embodiment of the invention, for instance, as in FIGS. 1, 2 and/or 3. Specifically, the ERP network 400 is a microwave ERP ring with only microwave nodes 100 and microwave links 102.

When an ERP port of a microwave node 100 (here e.g. node B or node C) detects a bandwidth degradation on the local link 102 (here the link BC), it can compare its current bandwidth with current bandwidth information of all the other remote microwave links 102 on the same ring. To this end, it may use bandwidth information from received BNMs. If the local link BC is the one with lowest current bandwidth on the ring, the degradation condition is fulfilled and ERP protection switching may be triggered by generating the signal 103 regarding the local link 102, for instance a SF signal. Notably, it is also possible to generate a manual switch (MS) signal, rather than SF, as the signal 103, in order to trigger ERP protection switching. However, in the following description of specific embodiment, SF is always assumed to be the signal 103.

In the scenario of FIG. 5, two links 102 are degraded. Namely, the bandwidth of the link BC is degraded from 400 Mbps to 100 Mbps, and the bandwidth of the link ED is degraded from 400 Mbps to 200 Mbps. At least some of the nodes and advantageously all the microwave nodes 100 in the network are aware of the current bandwidth of all the links 102 on the ring, and know that the link with the lowest current bandwidth is the BC link. The nodes B and C have therefore enough information to trigger ERP protection switching, thereby also signaling RAPS (SF) for the BC link 102 to other nodes 100. Further, the nodes D and E have enough information to not trigger ERP protection switching for the link DE.

If the DE link degrades after the nodes B and C have triggered ERP protection switching for the BC link degradation, the nodes D and E may not trigger the ERP protection switching. If the BC link 102 recovers from bandwidth degradation before the DE link, the nodes D and E may trigger ERP protection switching for the DE link 102 as soon as they receive BNMs indicating that the current bandwidth of the BC link 102 has increased, and therefore the local DE link 102 has become the one with the lowest current bandwidth in the network 400.

If the BC link 102 degrades after the nodes D and E have triggered ERP protection switching for the DE link degradation, the nodes D and E may clear ERP protection switching, as soon as they receive BNMs indicating that the current bandwidth of the BC link 102 has decreased below the current bandwidth of the DE link 102, and therefore the local DE link 102 is no longer the one with the lowest current bandwidth.

In case that there is more than one link 102 having the lowest current bandwidth, a tiebreak mechanism may be applied. For example, the MAC addresses of the nodes 100 attached to the links 102 having the lowest current bandwidths can be used as tiebreaker. That is, ERP protection switching is triggered only for the link 102 attached to the node 100 that has the lowest MAC address. Other tiebreak criteria can also be defined. For the following description, while it is possible to use other tiebreak criteria, it is assumed that the MAC address is used as a tiebreaker.

Figure 6:
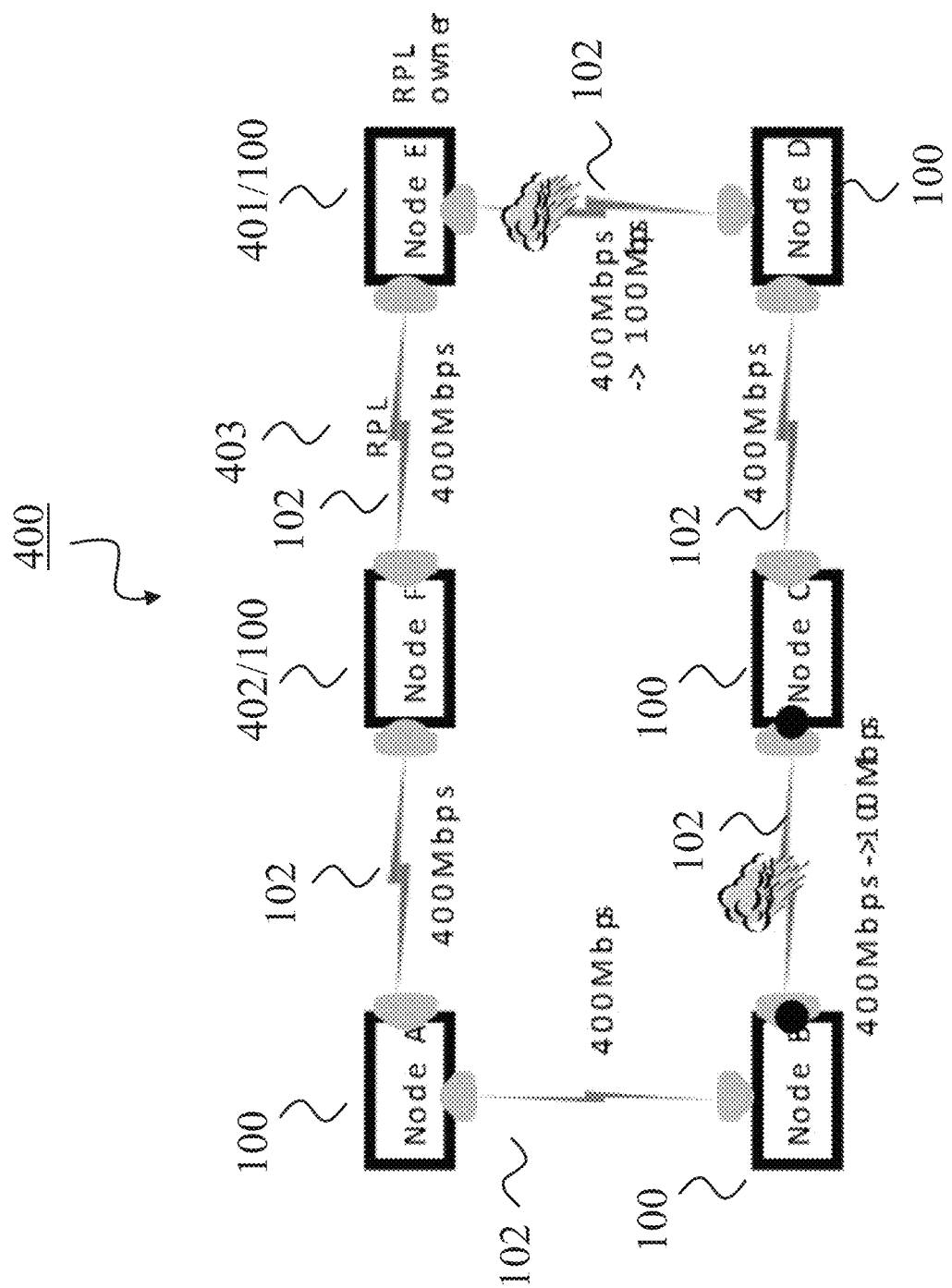
FIG. 6 shows an ERP network comprising microwave nodes according to an embodiment of the present invention, wherein two microwave links of the ERP network are equally degraded.

FIG. 6 also shows an ERP network 400 with microwave nodes 100 and links 102. In the scenario of FIG. 6, both the link BC and the link DE have a degraded bandwidth of 100 Mbps, lowered from a nominal bandwidth of 400 Mbps. At least some of the nodes and advantageously all the microwave nodes 100 are aware of the current bandwidth of all the links 102, and know that the links 102 with the lowest bandwidth are the BC and DE links. Since node B is the node 100 with the lowest MAC address among those with the links 102 showing the lowest current bandwidth, the nodes B, C, D and E have enough information to trigger ERP protection switching for the BC link 102 but not for the DE link 102.

The microwave nodes 100 may be aware of the MAC address of at least their adjacent node 100. If a node 100 does not know its neighbors MAC address, ERP protection switching may only be triggered by a node 100 at one end of the link 102 having the lowest current bandwidth (e.g. by the node 100 with the lowest MAC address) and not by its adjacent node 100. For example, in the scenario of FIG. 6, only node B may in this case trigger ERP protection switching, not node C.

Figure 7:
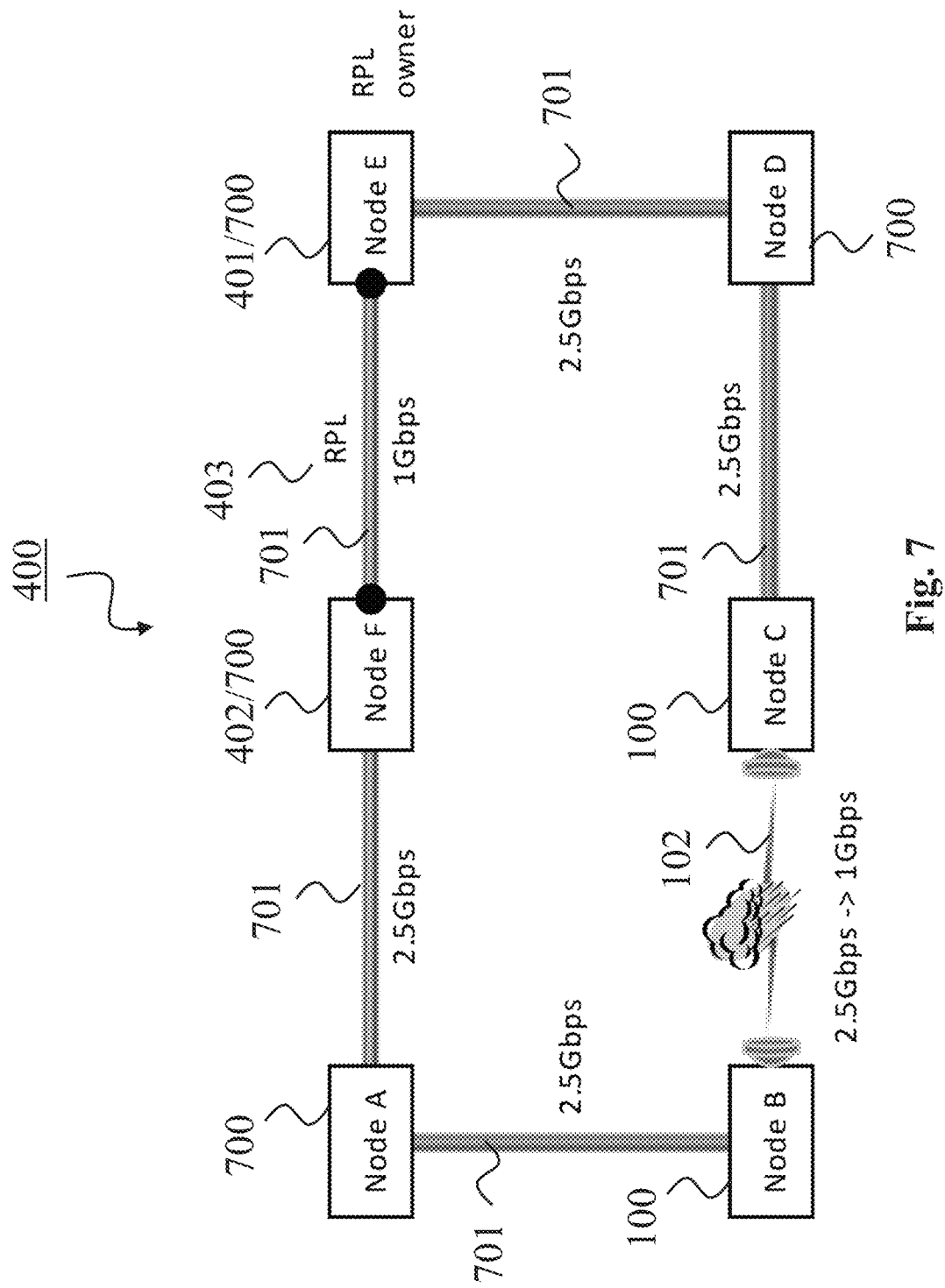
FIG. 7 shows an ERP network comprising microwave and non-microwave nodes according to an embodiment of the present invention, wherein one microwave link of the ERP network is degraded but not below the RPL bandwidth.

Embodiments of the present invention also allow deployment of hybrid ERP networks 400 (rings), where microwave nodes 100 and non-microwave nodes 700 and microwave links 102 and non-microwave links 701 are deployed (e.g. FIG. 7). Within this network 400, microwave nodes 100 (e.g. nodes having at least one microwave port attached to a microwave link 102) and non-microwave nodes 700 (e.g. nodes having two non-microwave ports attached to two non-microwave links 701) may co-exist. Accordingly, embodiments of the present invention are backward compatible with existing non-microwave nodes 700, since it needs to be implemented only on microwave ports of microwave nodes 100. Non-microwave ports implementations may only be compliant with current ITU-T G.8021 and G.8032. This means that they do not generate BNMs, they ignore any received BNMs, and trigger ERP protection only when their non-microwave link 701 fails.

If the RPL 403 is a microwave link 102 maintained by two microwave nodes 100, the solution of embodiments of the invention works as discussed above for the pure microwave networks 400. If all the non-microwave links 701 have a bandwidth higher or equal to the nominal bandwidth of the microwave RPL 403, it is ensured that in case of link bandwidth degradation, ERP protection switching is triggered only for the microwave link 102 with the lowest current bandwidth. Instead, if the RPL 403 is a non-microwave link 701—maintained by two non-microwave nodes 700 or two non-microwave ports of microwave nodes 100—the information of the RPL bandwidth may be configured in all the microwave ports to make sure that microwave ports do not trigger ERP protection switching, until the current bandwidth of their link 102 degrades below the RPL bandwidth.

It is moreover also possible to configure the microwave ports of microwave nodes 100 such that they do not generate BNMs during normal conditions. In this case, the information of the RPL nominal bandwidth should be configured for microwave RPL 102 and non-microwave RPL 701.

It is worth noting that the RPL may be chosen among the links 102/701 with the lowest nominal bandwidth, in order to have the highest possible ring throughput during normal conditions. The solution of embodiments of the invention allows having the highest possible throughput also during bandwidth degradation conditions of microwave links 102.

FIG. 7 shows a network 400 including exemplarily two microwave nodes 100 (B and C) connected by a microwave link 102 (BC), and several non-microwave nodes 700 and links 701. In the scenario of FIG. 7, the nodes B and C are configured with the RPL bandwidth such that they do not trigger ERP protection switching, until the BC link 102 bandwidth degrades below the RPL bandwidth, e.g. before the nominal bandwidth of 2.5 Gbps drops below the bandwidth of 1 Gbps of the RPL 403. Accordingly—as illustrated in FIG. 7—ERP protection switching is not yet triggered, and the link BC is still unblocked, while the RPL 403 is still blocked.

Figure 8:
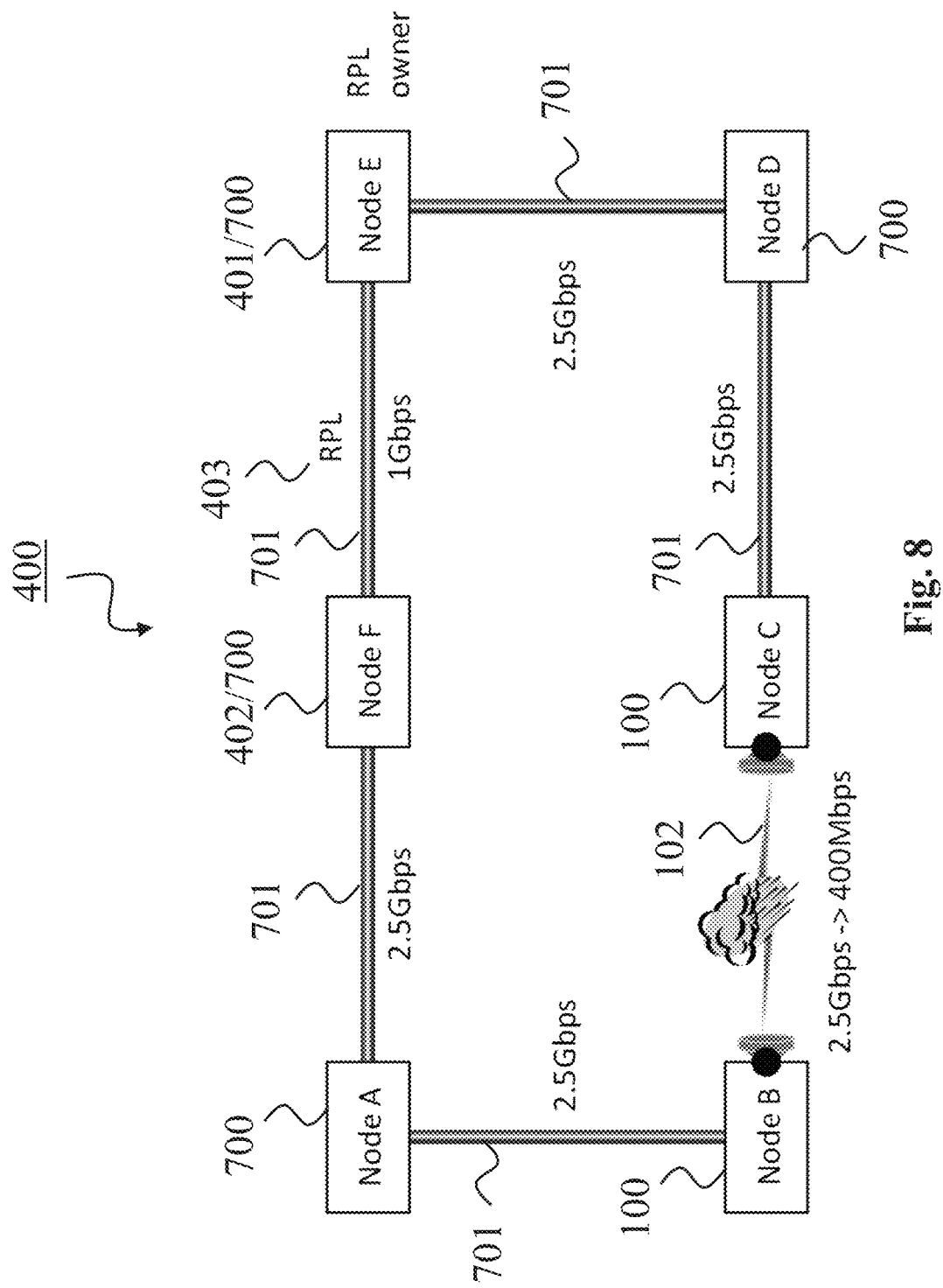
FIG. 8 shows an ERP network comprising microwave and non-microwave nodes according to an embodiment of the present invention, wherein one microwave link of the ERP network is degraded below the RPL bandwidth.

FIG. 8 shows the same network 400. FIG. 8 illustrates that when the bandwidth of the link BC drops further from 1 Gbps to 400 Mbps, e.g. below the RPL bandwidth of 1 Gbps, the ERP protection switching is triggered. Accordingly, the BC link 102 is blocked and the RPL 403 is unblocked.

In case one or more microwave links 102 or non-microwave links 701 fail, and one or more other microwave links 102 degrade, ERP protection switching may not be triggered for the degraded microwave links 102. This behavior may "emulate" other protection switching technologies, where SF has higher priority than signal degrade (SD). If microwave links 102 fail, BNMs indicating that their current bandwidth is zero could be sent, such that failed microwave links 102 will inevitably be considered as those with the lowest current bandwidth. Accordingly, ERP protection switching will not be triggered for degraded links 102 having a current bandwidth greater than zero.

However, this mechanism may not work when a non-microwave link 701 fails. Typically, if a non-microwave link 701 fails, a RAPS (SF) messages (signaling SF conditions) is sent by the non-microwave node 700. However, a RAPS (SF) message may also be used by a microwave node 100 to signal link bandwidth degradation conditions to other microwave nodes 100. Thus, detecting a RAPS (SF) message may not be sufficient to understand for a microwave node 100 that a microwave link 102 failed. However, since non-microwave nodes 700 do not generate BNMs, a microwave node 100 can understand that a non-microwave link 701 has failed, when an RAPS (SF) message for that link 701 is received, but no BNM for the same link 701 is received.

It is moreover also possible to configure the microwave ports of microwave nodes 100 such that they do not generate BNMs during a signal failure condition. In this case, detection of signal failure conditions for microwave links 102 and non-microwave links 701 will follow the same procedure.

Due to the above, microwave nodes 100 advantageously generate RAPS messages and BNMs using consistent identifiers to allow other microwave nodes 100 to understand that they are reporting RAPS and current bandwidth information for the same link 102. One possibility is that the MAC address used for a BNM is the same as the node-id used in the RAPS message and that the port-id used in a BNM is the same as the Block Port Reference (BPR) used in the RAPS message.

Figure 9:
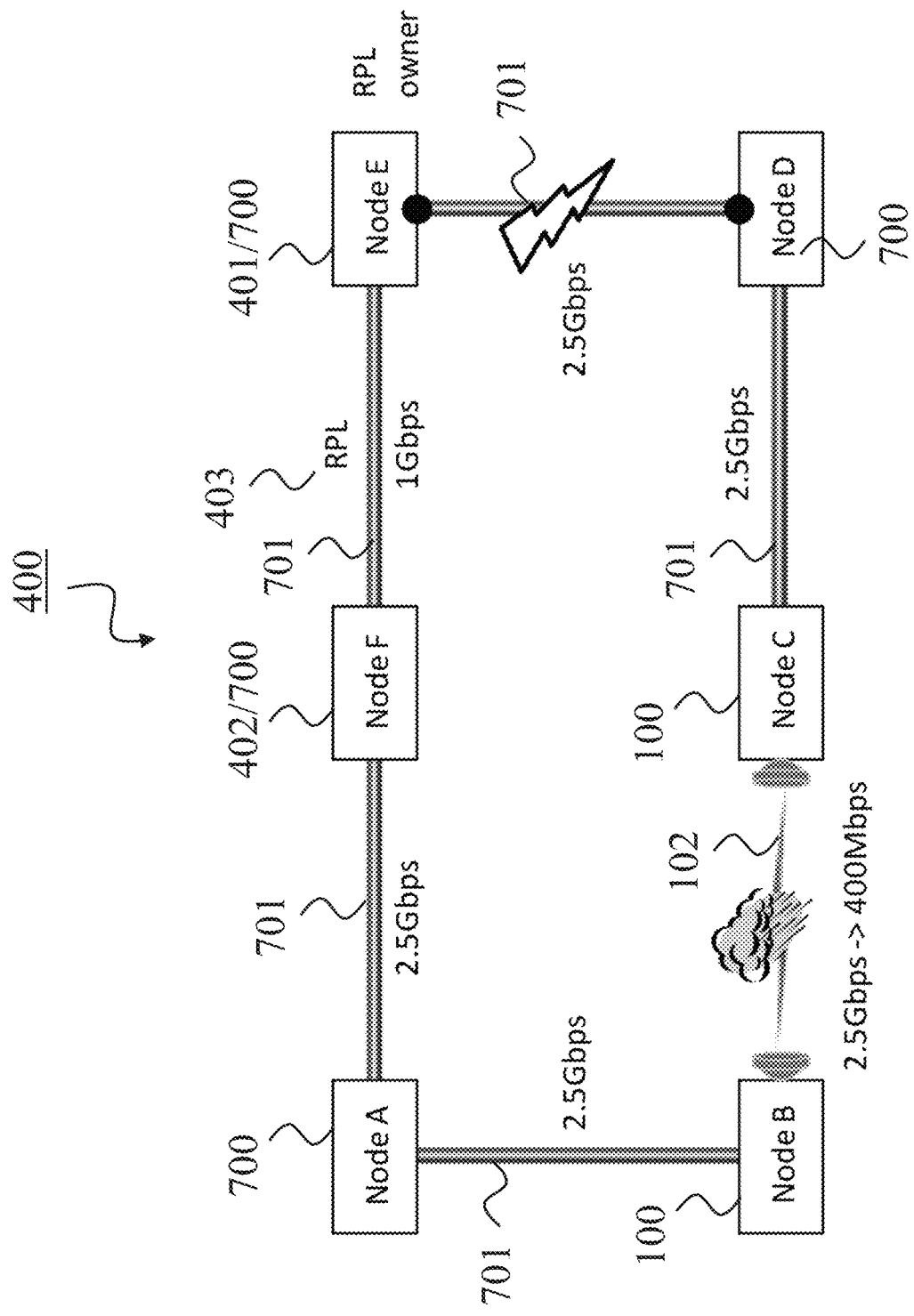
FIG. 9 shows an ERP network comprising microwave and non-microwave nodes according to an embodiment of the present invention, wherein one microwave link of the ERP network is degraded below the RPL bandwidth and one non-microwave link failed.

FIG. 9 shows the same network 400 as FIG. 8. In the scenario of FIG. 9, the microwave nodes B and C can understand from the RAPS (SF) messages received from the non-microwave nodes D and E, and from the lack of BNMs received from these nodes D and E, that the DE link (a non-microwave link 701) failed. Therefore, the nodes B and C do not trigger ERP protection switching when the BC link (a microwave link 102) is only degraded. Consequently, only the DE link 701 is blocked by the ERP protocol and state machine.

Figure 10:
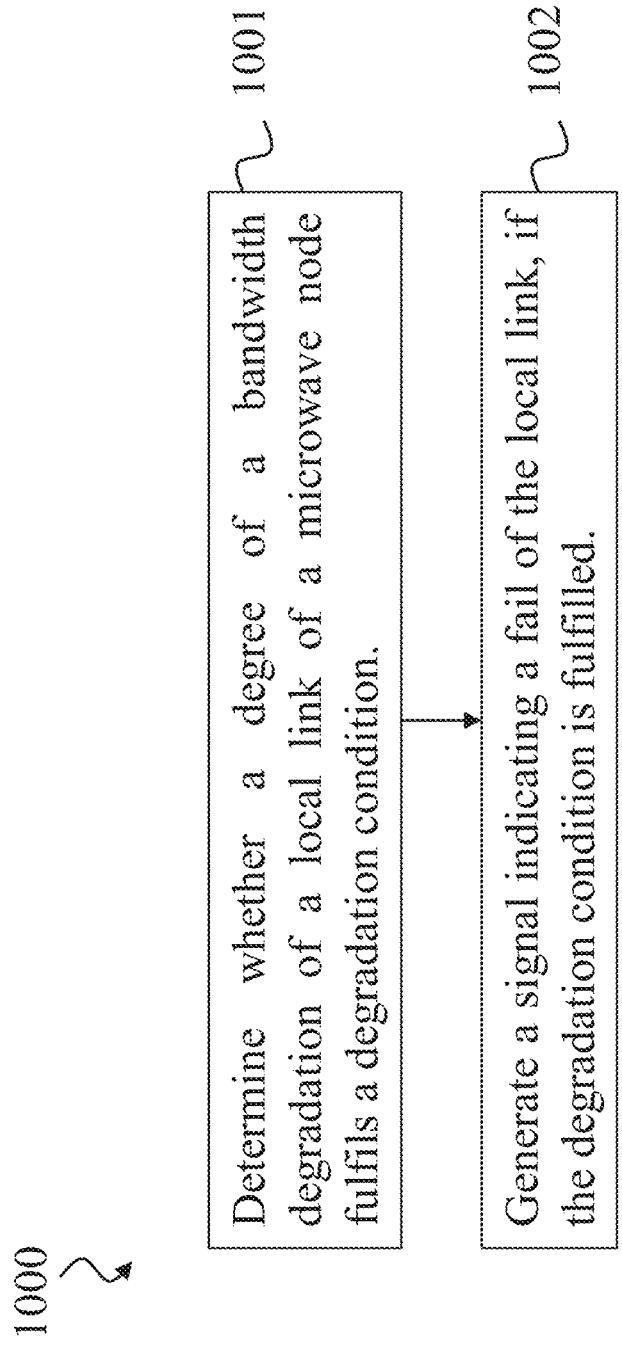
FIG. 10 shows a method according to an embodiment of the present invention.

FIG. 10 shows a method 1000 according to an embodiment of the invention. The method 1000 is for ERP, and comprises: a first step 1001 of determining, whether a degree of a bandwidth degradation of a local link 102 of a microwave node 100 fulfils a degradation condition, and a step 1002 of generating a signal 103 indicating a fail of the local link 102, if the degradation condition is fulfilled.

Figure 11:
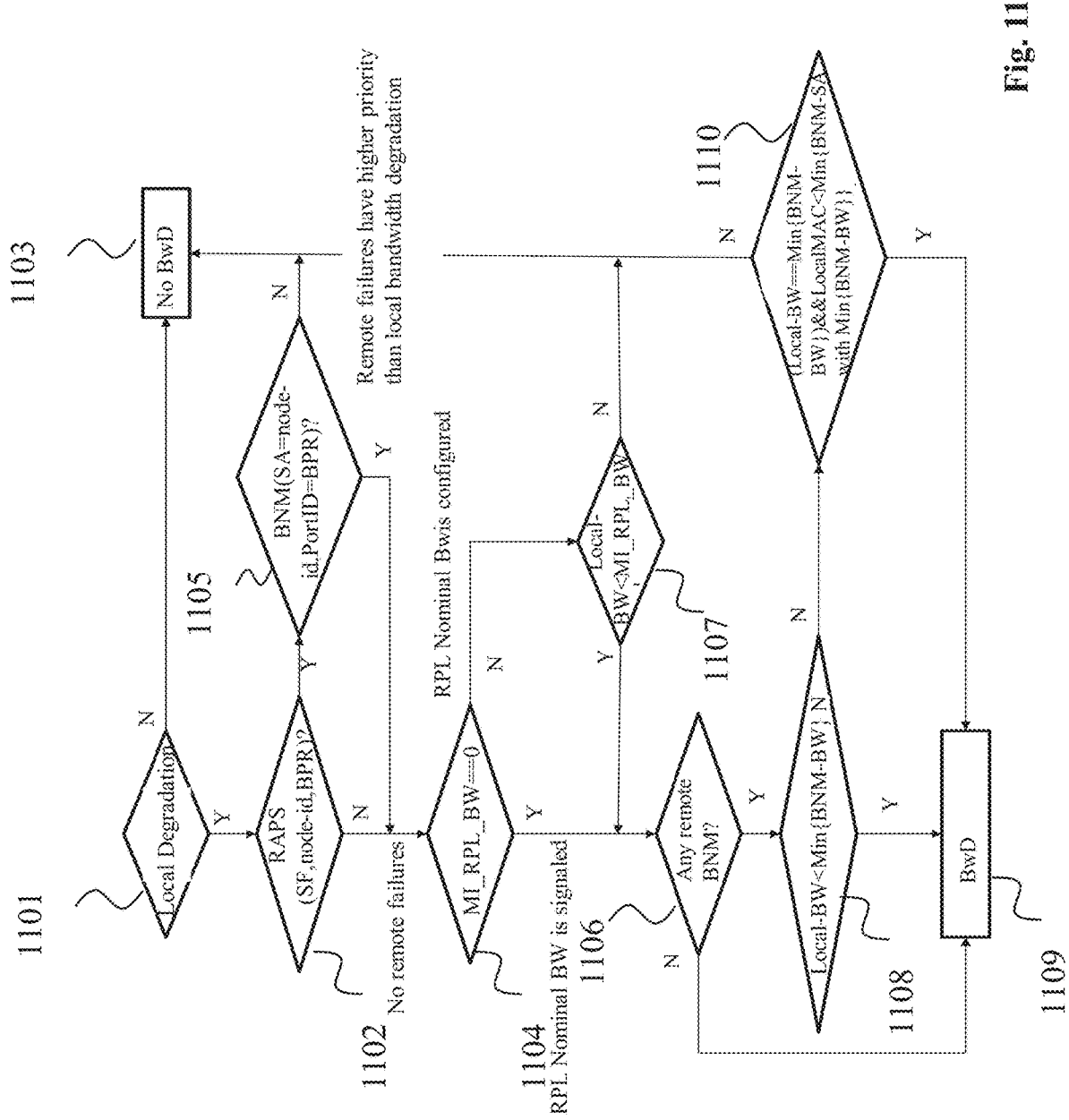
FIG. 11 shows a method according to an embodiment of the present invention.

The method 1000 may be carried out in a node 100 according to an embodiment of the present invention, for instance in the at least one processor 101, for example by at least one decision logic. The first step 1001 of the method 1000 as carried out in the at least one processor 101—as e.g. implemented by the Bandwidth Degrade Decision block 301 in FIG. 3—is outlined in FIG. 11 in exemplary detail.

First, it is determined at 1101 whether a local link 102 of the microwave node 100 is degraded. If no link 102 is degraded, then it is determined at 1103 that the degradation condition is not fulfilled. If a link 102 is degraded, then it is further checked at 1102 whether a RAPS message is received from another node 100 or 700. If a RAPS message is received, then it is checked at 1105 whether a BNM (one or more messages) is received with the same identifier, e.g. from another microwave node 100. If such BNM is not received, then this indicates that e.g. a non-microwave link 701 has failed, and it is determined at 1103 that the degradation condition is not fulfilled.

If at 1105 it is determined that a BNM (one or more messages) with the same identifier is received, or if at 1102 no RAPS message is received, then it is further determined at 1104, whether a RPL nominal bandwidth is configured on all microwave nodes on the ring or whether a RPL nominal bandwidth is signaled. If a RPL nominal bandwidth is configured, then the RPL 403 may be non-microwave link 701 (or a microwave link 102 that is configured not to generate BNM during normal condition), and it is further checked at 1107 whether a bandwidth of the local link 102 is below the configured RPL nominal bandwidth. If it is not below the configured RPL nominal bandwidth, then it is further determined at 1103 that the degradation condition is not fulfilled.

If it is determined at 1107 that the bandwidth of the local link 102 is below the configured RPL nominal bandwidth, or if it is determined at 1104 that no RPL nominal bandwidth is configured but is signaled (e.g. the RPL 403 is a microwave link 102 reporting via BNM in normal conditions the current bandwidth equal to the RPL nominal bandwidth), then it is further determined at 1106 whether any BNM from another microwave node 100 is received. If no BNM is received, then it is further determined at 1109 that the bandwidth degradation condition is fulfilled. Accordingly, the signal 103 is generated.

If a BNM (one or more messages) is received at 1006, then it is further checked at 1108, whether the bandwidth of the local link 102 is lower than all bandwidth information reported in all received BNM(s). If it is lower, and thus is the lowest link bandwidth in the network 400, then it is further determined at 1109 that the bandwidth degradation condition is fulfilled. Accordingly, the signal 103 is generated.

If it is determined at 1108 that the bandwidth of the local link 102 is not lower than all the bandwidth information reported with all the BNM(s), then it is further determined whether it is at least equally low than the lowest reported bandwidth (information). If it is not equally low (e.g. higher), then it is not the lowest bandwidth in the network 400, and it is further determined at 1103 that the degradation condition is not fulfilled.

If it is equal to the lowest reported bandwidth, then a tiebreak condition is applied at 1110, for instance, based on a lowest MAC address. If the node 100 has e.g. the lowest MAC address, then it is further determined at 1110 that it has the link 102 with the lowest bandwidth in the network 400, and it is further determined at 1109 that the bandwidth degradation condition is fulfilled. Accordingly, the signal 103 is generated. If the node 100 has e.g. not the lowest MAC address, then it is considered to not have the link 102 with the lowest bandwidth in the network 400, and it is accordingly determined at 1103 that the degradation condition is not fulfilled.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation

What is claimed is:

1. A microwave node for an Ethernet Ring Protection (ERP) network, the microwave node comprising:
a processor configured to execute a program, the program comprising instructions when executed causes the processor to:
determine, based on a bandwidth notification message (BNM) received from a first node in the ERP network, whether a degree of bandwidth degradation of a local link of the microwave node fulfils a degradation condition;
generate, in response to determining that the degradation condition is fulfilled, a signal indicating a fail of the local link; and
determine, in response to receiving from a second node a signal indicating signal fail of a remote link of the second node and having an identifier, and determining, according to the identifier, that a BNM from the second node has not been received, that the degradation condition is not fulfilled.

2. The microwave node according to claim 1, wherein the program comprises further instructions that when executed cause the processor to determine that the local link is under bandwidth degradation, in response to determining that a current bandwidth of the local link is smaller than its nominal bandwidth but larger than zero bandwidth.

3. The microwave node according to claim 1, wherein the signal indicating a fail of the local link is a signal fail or a manual switch signal.

4. The microwave node according to claim 1, wherein to determine whether the degree of bandwidth degradation of the local link fulfills the degradation condition,
the program comprises further instructions that when executed cause the processor to determine whether the local link is currently the link in the ERP network with the lowest bandwidth.

5. The microwave node according to claim 4, wherein the BNM received from the first node includes current bandwidth information of a remote link of the first node; and wherein, for determining whether the local link is currently the link in the ERP network with the lowest bandwidth, the program comprises further instructions that when executed cause the processor to compare the current bandwidth of the local link with the current bandwidth information of the remote link included in the BNM.

6. The microwave node according to claim 5, wherein for determining whether the local link is currently the link in the ERP network having the lowest bandwidth, the program comprises further instructions that when executed cause the processor to apply a tiebreak condition, in response to determining that the current bandwidth of the local link matches the current bandwidth information of the remote link included in the received BNM.

7. The microwave node according to claim 6, wherein for applying the tiebreak condition, the program comprises further instructions that when executed cause the processor to determine the link of the node having the lowest MAC address as the link currently having the lowest bandwidth in the ERP network.

8. The microwave node according to claim 1, wherein the microwave node is configured to send a BNM including current bandwidth information of the local link to all other nodes in the ERP network.

9. The microwave node according to claim 8, wherein:
the microwave node is further configured to send a message notifying a fail of the local link to the other nodes in the ERP network, and
the message and the BNM, which are sent to the other nodes, include a same identifier of the microwave node and local link.

10. The microwave node according to claim 1, further comprising an ERP control process configured to receive the signal indicating a fail of the local link generated by the processor, and able to block the local link upon receiving said signal.

11. The microwave node according to claim 10, wherein the ERP control process is configured to unblock, in response to determining that the microwave node is an owner node or neighboring node of a Ring Protection Link (RPL) of the ERP network, the RPL upon receiving the signal indicating a fail of the local link from the processor.

12. The microwave node according to claim 10, wherein determining that the microwave node receives the signal indicating signal fail of the remote link from the second node, but did not receive a BNM that includes an identifier of the second node, indicates that the second node is a non-microwave node.

13. The microwave node according to claim 12, wherein the ERP control process is able to unblock the local link, in response to determining that the degree of bandwidth degradation of the local link does not anymore fulfil the degradation condition.

14. The microwave node according to claim 1, wherein for determining whether the degree of bandwidth degradation of the local link fulfills the degradation condition, the program comprises further instructions that when executed cause the processor to determine whether the bandwidth of the local link of the microwave node is below a configured nominal bandwidth of a Ring Protection Link (RPL) of the ERP network.

15. The microwave node according to claim 1, wherein the program comprises further instructions that when executed cause the processor to generate the signal indicating a fail of the local link, in response to determining that the degradation condition is fulfilled and/or that at least one local fail condition is fulfilled.

16. A method for Ethernet Ring Protection (ERP) network, the method comprising:
determining, based on a bandwidth notification message (BNM) received from a first node in the ERP network, whether a degree of a bandwidth degradation of a local link of a microwave node fulfils a degradation condition;
generating, in response to determining that the degradation condition is fulfilled, a signal indicating a fail of the local link; and
determining, in response to receiving from a second node a signal indicating signal fail of a remote link of the second node and having an identifier, and determining, according to the identifier, that a BNM from the second node has not been received, that the degradation condition is not fulfilled.

17. The method according to claim 16, comprising determining, for determining whether the degree of bandwidth degradation of the local link fulfills the degradation condition, whether the local link is currently the link in the ERP network with the lowest bandwidth.

18. The method according to claim 16, comprising determining, for determining whether the degree of bandwidth degradation of the local link fulfills the degradation condition, whether the bandwidth of the local link of the microwave node is smaller than a nominal bandwidth but larger than zero bandwidth.

19. The method according to claim 16, comprising determining, for determining whether the degree of bandwidth degradation of the local link fulfills the degradation condition, whether the bandwidth of the local link of the microwave node is below a configured nominal bandwidth of a Ring Protection Link (RPL) of the ERP network.

20. A computer program product storing instructions, which when executed on a processor cause the processor to:
determine, based on a bandwidth notification message (BNM) received from a first node in an ERP network, whether a degree of a bandwidth degradation of a local link of a microwave node fulfils a degradation condition;
generate, in response to determining that the degradation condition is fulfilled, a signal indicating a fail of the local link; and
determine, in response receiving from a second node a signal indicating signal fail of a remote link of the second node and having an identifier, and determining, according to the identifier, that a BNM from the second node has not been received, that the degradation condition is not fulfilled.

* * * * *